United States Patent [19]
Redenbaugh

[11] Patent Number: 4,779,376
[45] Date of Patent: * Oct. 25, 1988

[54] DELIVERY SYSTEM FOR SEEDS

[75] Inventor: M. Keith Redenbaugh, Davis, Calif.

[73] Assignee: Plant Genetics, Inc., Davis, Calif.

[*] Notice: The portion of the term of this patent subsequent to Apr. 22, 2003 has been disclaimed.

[21] Appl. No.: 852,011

[22] Filed: Apr. 14, 1986

Related U.S. Application Data

[63] Continuation-in-part of Ser. No. 545,678, Oct. 25, 1983.

[51] Int. Cl.$^4$ .............................................. A01C 1/06
[52] U.S. Cl. ................................................... 47/57.6
[58] Field of Search ................... 47/57.6, 58, DIG. 9; 800/1

[56] References Cited

U.S. PATENT DOCUMENTS

| | | | |
|---|---|---|---|
| 3,973,355 | 8/1976 | McKenzie | 47/57.6 X |
| 4,249,343 | 2/1981 | Dannelly | 47/57.6 |
| 4,562,663 | 1/1986 | Redenbaugh | 47/58 |

Primary Examiner—Robert E. Bagwill
Attorney, Agent, or Firm—Limbach, Limbach & Sutton

[57] ABSTRACT

Novel methods and compositions are provided for the delivery of botanic seeds to an environment for growth and development. Seeds are combined with beneficial adjuvants in an encapsulating, saturated hydrogel matrix which provides a system for the simultaneous delivery of seeds and adjuvants.

18 Claims, No Drawings

DELIVERY SYSTEM FOR SEEDS

This application is a continuation in part of our application Serial No. 545,678 filed October 25, 1983, and is assigned to a common assignee.

TECHNICAL FIELD

This invention relates generally to the field of agriculture and crop production and more particularly to the delivery of seeds together with substances which enhance their growth and development.

BACKGROUND OF THE INVENTION

The conventional techniques of crop and plant delivery in agriculture include placing seed directly in the ground either by hand or machine planting. Either of these techniques may be incorporated in a broadcast or precision sowing method. Such seed is commonly planted untreated or sometimes treated to a brief dip in a fungicide or covered with a layer of dry diatomaceous earth (or other appropriate material) with or without dried preparations of microorganisms. Additionally, seed may be coated with compounds (such as methyl cellulose or sodium alginate) in which a solvent is required for initial coating of the seed. Subsequently, the solvent is evaporated or dried off to result in a final coating that is not saturated or complexed ionically. Saturation is a concept incorporated herein which is defined to be where no more solvent or liquid can be absorbed or retained.

As an alternative, such seeds, treated or untreated, are first sown in greenhouse or nursery beds. Plantlets are raised to a particular size before transplanting to the field. Conventional methods of seed planting and transplant production are well known and described in the literature. See, e.g., J. H. Martin and W. H. Leonard, "Principles of Field Crop Production," (Macmillan Company, N.Y., 1949); J. H. MacGillivray, "Vegetable Production," (Blakiston Co., N.Y., 1953); and R. L. Carolus, "Possibilities with the Use of Pelleted Seed" (Ohio Veg. and Potato Growers Assoc., Ann. Proc. 34: 56062, 1949).

The conventional technique of delivery of adjuvants that affect plant, insect, fungus, bacteria, animal and other growth is to apply the adjuvant physically separate from the plant seed. Plant nutrients, pesticides, beneficial microorganisms and other biologically active compounds are applied (1) before the time of seed planting by soil incorporation or by placement on top of the soil, (2) to the soil as the seeds are being planted, or (3) after the seeds are planted by soil incorporation, spray application, or other physical means. Conventional methods are well known and described in the literature. See, e.g. J. Janick, R. W. Schery, F. W. Woods, V. W. Ruttan, "Plant Science," (W. H. Freeman, San Francisco, 1974); and "Western Fertilizer Handbook," (Institute Printers and Publishers, Danville, Ill., 1975).

A major limitation to these conventional methods is the requirement to plant the seeds and deliver the adjuvants separately, usually by way of separate passes through the field with the tractor. This is costly as well as harmful since it increases the incidence of soil compaction due to the tractor weight.

An additional limitation is that the adjuvant is not precisely applied to the specific points in the field where the adjuvant reacts with the seed or its microenvironment. For beneficial microorganisms, the specific application point is at the seed, where developing roots will interact with the applied microorganisms. The same application point is suggested for herbicides to limit weed competition, nematicides to control root invading nematodes, insecticides to control both root and upper plant-attacking insects, nutrients to nourish the developing plant, as well as other adjuvants to benefit seed establishment and growth. Because adjuvant application by conventional methods is non-precise much of the adjuvant is wasted or non-effective.

A further limitation is that many adjuvants are volatile, flammable, toxic or otherwise environmentally hazardous, and therefore, pose difficulty in handling and application for both the operator and the environment.

A still further limitation is that conventional methods do not provide a system for delivery of a seed that has undergone seed inbibition (priming) but which seed has not then been subsequently dried.

It has been recognized that some of these difficulties may be overcome by incorporating some of the adjuvants, specifically micro-organisms, in a dry covering around the seed. See, e.g., T.V. Suslow and M. N. Schroth (Phytopathology 72: 199, 1982). This technique provides for direct application of microorganisms with the seed. However, the process to coat the seed requires that both the seeds and microorganisms be dried, a process that often results in decreased seed germination rates and death of a majority of the microorganisms.

It has also been recognized that the adjuvants can be applied to the seed in the form of a wet seed coating (water added to facilitate the coating process), which coating is subsequently dried to form a less than saturated seed coating around the seed. See, e.g., Scott (U.S. Pat. No. 2,967,376). However, the process to coat the seeds requires that both the seeds and adjuvants be subsequently dried, a process that damages the seed if priming has occurred.

Another technique which has found some use is fluid drilling. Pre-germinated seeds are delivered, occasionally with microorganisms or other additives, in a thick slurry by means of special implements. See, e.g. Taylor, J. D. and C. L. Dudley, "Rhizobium . Inoculation of Dwarf Beans", Nat. Veg. Res. Sta. U.K. 28th Ann. Rep. p. 105 (1977); Hardaker, J. M. and R. C. Hardwick, "A Note on Rhizobium Inoculation of Beans", Expl. Agric. 14:17-21 (1978); Entwistle, A. R. and H. L. Munasinghe, "The Control of White Rot (Sclerotium cepivorum) in Fluid-drilled Salad Onions" J. Hort. Sci. 56:251-54 1981). However, this method does not allow for singulation of seeds in a deliverable, saturated hydrogel capsule. Further, this method does not permit precise seed planting. Seed viability is often reduced, and specialized planting equipment is required.

A further technique which has been suggested for delivery of seeds is to mix the seeds in a hydrogel of a high molecular weight hydrophilic polymer. The polymer, preferably containing a basic carboxylic acid salt residue, is cross-linked. The resultant mixture is combined with water to form a non-sticky hydrogel. The hydrogel, combined with seeds, is poured or dribbled along a row of soil to affect seed germination. See, e.g., S. Kitamura, M. Watanabe, M. Nakayama, and S. Ouchii (Japanese Patent 1983 33508, assigned to Sumitomo Chemical Co.). However, this process is similar to fluid drilling and does not allow for seed singulation nor allow for precision seed planting. Furthermore, the hydrogel/seed mixture is not a unitized, easily handled package that can be planted using existing seed handling and planting equipment.

It has been suggested that adjuvants be microencapsulated to provide controlled release of the adjuvants, thereby lengthening the time of activity. See, e.g., T. J. Roseman and S. Z. Mansdorf, "Controlled Release Delivery Systems" (Marcel Dekker, Inc., N.Y., 1983. However, this technique does not provide for precision placement of the adjuvants where they will be most effective.

Thus, an object of this invention is to provide a technique whereby seeds are advantageously combined with adjuvants prior to planting.

Another object of this invention is to control germination and development of the seeds.

Yet another object of the invention is to provide a saturated medium to deliver the seeds together with adjuvants.

A further object of the invention is to reduce the amount of handling and time required for delivery of seeds and adjuvants to field, nursery, or greenhouse.

A still further object of the invention is to provide a delivery method for seeds and adjuvants.

A final object of the invention is to control the release of the seeds and adjuvants.

DISCLOSURE OF THE INVENTION

Methods and compositions are provided for the delivery of seeds and beneficial adjuvants to an environment for growth and development wherein the seeds are encapsulated in a saturated hydrogel together with an effective concentration of at least one adjuvant capable of affecting the seeds, the resulting plant body or their environment.

BEST MODE FOR CARRYING OUT THE INVENTION

In accordance with the invention, methods and compositions are provided for delivering seeds and beneficial adjuvants as a unit by encapsulating these components in a saturated hydrogel. Also included with the seeds are various accessory structures and compounds which promote the development and survival of the plant and which function to impede the progress of competitors.

The accessory structures and compounds normally included with seeds can be substituted or supplemented by various adjuvants including microorganisms and biologically active compounds which will modify the plant or its environment to enable the tissue to thrive and compete more successfully for resources. These various adjuvants can be mixed together in a homogeneous solution and subsequently into a preformed gel or layered onto a core (containing for example seeds) to build up a multi-layered capsule with components arranged in a specific order for delivery and release. As an additional alternative, the various components of the capsule can be microencapsulated or otherwise treated to impede or control release of the components as well as to protect components from other adjuvants or materials within the capsule.

In accordance with the invention, seeds and adjuvants are combined for delivery by encapsulating the components in a saturated hydrogel which can control germination and development of the seeds as well as the release and function of the encapsulated adjuvants.

SELECTION OF SEED

Botanic seed is a means which has evolved to deliver the progeny of plants to sites which are suitable for development and growth. The essential element of botanic seed is the meristematic tissue which differentiates to form an entire plant body.

Botanic seed is readily available from most plant and crop species. Seed production methods are well known to the industry. See, e.g., J. Janick, R. W. Schery, F. W. Woods, V. W. Ruttan, "Plant Science" (W. H. Freeman, San Francisco, 1974); and H. T. Hartmann and D. E. Kester, "Plant Propagation" (Prentice-Hall, Englewood Cliffs, N.J., 1975). Thus any available botanic seed can be encapsulated in accordance with the present invention.

ENCAPSULATION MEDIA-GELS

It has been recognized that the germination and development of seeds may be enhanced by coating them with various materials. For example, it has been reported that coating seeds with Super Slurper (USDA) will result in a water-absorbent reservoir which improves the germination rate in arid conditions.

It has been demonstrated that perishable foods may be preserved by coating them with a complexed carbohydrate, e.g. Earle U.S. Pat. No. 3,395,024. There are also reports of seeds coated with dried materials, using, e.g. alginate, as a binding compound, U.S. Pat. Nos. 3,545,129 and 3,698,133; Dexter, S. T. and T. Miyamoto, Agron J., 51:338 (1959).

It has further been reported that somatic embryos can be encapsulated using alginate, U.S. Pat. No. 4,562,663.

The seeds can be encapsulated in accordance with the present invention in any of numerous media which provide an appropriate encapsulation matrix, hereafter termed "gel." In general, a gel will allow seed respiration by permitting diffusion of gases. The gel should provide a capsule strong enough to resist external abrasion and adverse forces, yet pliable enough to allow the growth of the seed and its germination at the appropriate time. Gels finding use in the present invention are preferably, but not exclusively, hydrogels, which are saturated with water within the confines of the gel matrix. It may be desirable to use various gels in combination, either as a mixture or in layers, to achieve the desired results.

One novel feature of the present invention involves the final water content of the encapsulated seed. In the prior art, it is known to provide an encapsulant with beneficial adjuvants. See U.S. Pat. No. 2,967,376 to Scott. The capsules of the present invention differ from the prior art in that the capsules of the present invention contain free water, which may be used by the seed to initiate the process of germination at the time of delivery. The prior art teaches capsules which are dry at delivery, surrounding dry seeds. In the present invention, water is added to the gel agent in proportions ranging from 10 to 99%, preferably 40–70%, of the weight of the seed mass to be encapsulated, preferably 40–70%. This additional water is available to the seed and is not driven off prior to seed delivery. Thus, for the first time, saturated hydrogel capsules are provided for encapsulating botanic seed which still retain free water at the time of delivery.

Gels which have been found useful for encapsulating seeds include sodium alginate, guar gum, carrageenan with locust bean gum, agar, carboxymethycellulose, gum tracanth, sodium pectate, Borden Polyco 2113 ®(vinyl acetate homopolymer), and sodium alginate with gelatin. Other suitable gels include, but are not limited to:

TABLE 1

GEL AGENTS

I. Natural Polymers
   A. Ionic bonds (requires complexing agents)
      Alginate with Gelatin
      Furcellaran
      Pectin
      Hypnean
      Dextran
      Tamarind
      Guar Gum
   B. Hydrophobic Interactions
      Amylose
      Agarose
      Agar with Gelatin
      Gelatin
      Starch
      Amylopectin
      Cornhull Gum
      Starch Arabogalactan
      Gum Ghatti
      Gum Karagan
      Ti Gum
      Wheat Gum
      Chitin
      Dextrin II. Chemically Modified Natural Polymers
   A. Ionic bonds (requires a complexing agent)
      Ethyl Succinylated Cellulose
      Succinylated Zein
   B. Hydrophobic Interactions
      Methylcellulose
      Hydroxyethyl Cellulose
   C. Covalent Bonds
      Gelatin with Glutaraldehyde III. Synthetic Polymers
   A. Covalent Bonds
      Polyacrylamide
   B. Hydrophobic Interactions
      Polyethylene Glycol
      Polyvinylpyrrolidone
      Polyoxyethylene
      Hydrophilic Urethane
      Polyvinylacetate
      Vinyl Resins
      Hydron (hydroxyethylmethacrylate)
      2-methyl-5-vinylpyridine-methacrylate-methacrylic acid
   C. Ionic Bonds
      Sodium poly (styrene sulfonate) with poly(vinyl methyl pyridinium) chloride
      Sodium poly (styrene sulfonate) with poly (vinyl benzyl trimethyl ammonium) chloride
      Strongly acidic polyanion with strongly basic polycation
      Gelvatol ® (polyvinyl alcohol resin) (Monsanto)

IV. Stabilizing Compounds
   A. Trade Names
      Super Slurper ® (USDA, SEA-AR, Nor. Reg. Res. Lab)
      Viterra ® (Union Carbide)
      Laponite ® (Laporte (United States) Inc.)
      Gelrite ® (Kelco)
      SeaKem ® (FMC Corporation)
      SeaPlaque ® (FMC Corporation)
      SeaPrep ® (FMC Corporation)
      IsoGel ® (FMC Corporation)
   B. Organic Compounds
      Methylan Clear Wallpaper Paste
      Lactose
      Wax TABLE 1-continued

GEL AGENTS

Protein Colloids
   C. Inorganic Compounds
     1. Clay
     2. Compounds that adhere by means of a water water-soluble plastic such as methylcel:
        Fly Ash
        Feldspar
        Celrite
        Bentonite
        Vermiculite
        Diatomaceous Earth
        Lime
        Calcium Carbonate
     3. Other
        Calcium Oxide
        Magnesium Carbonate
        Sodium bicarbonate
        Urea

Selecting Optimum Gels

A gel chosen for encapsulation would usually include the following characteristics (although the invention may be practiced in other modes):

1. A compliance adequate to protect and cushion the seed in a saturated hydrogel;
2. The interior material would have solubility or emulsion forming characteristics such that it can accept and contain adjuvants, including but not limited to aqueous or hydrophobic substances;
3. An outer surface to provide a protective barrier to mechanical stress, facilitate handling and maintain seed viability;
4. Sufficient gel strength to maintain capsule integrity, but still allow the seed radicle and shoot to break out during germination and for the adjuvants to be released.

SELECTION OF ADJUVANTS

It has been recognized that plant establishment, growth and development may be enhanced by addition of adjuvants to the soil, to the rhizosphere of the plant, and to the surface of the plant. It has also been demonstrated that controlled release of the adjuvants may provide additional enhancement to plant growth, e.g. T. J. Roseman and S. Z. Mansdorf "Controlled Release Delivery Systems," (Marcel Dekker, Inc., N.Y., 1983).

Adjuvants which have been found to be useful for encapsulation with seeds include pesticides(bensulide, EPTC, metribuzin, pebulate, prometryn, pronamide, chlorpropham, alachlor, and diazinon), fertilizers (superphosphate, calcium phosphate, potassium phosphate, potassium nitrate, calcium nitrate and ammonium nitrate), energy sources (starch and sucrose) and microorganisms (Rhizobia meliloti, R. leguminosarum, Azospirillum and Eschericia coli).

Other suitable adjuvants include, but are not limited to:

TABLE 2

ADJUVANTS

I. Pesticides
   A. Herbicides
     1. Phenoxy compounds
        2,4-D
        MCPB
        2,4,5-T

TABLE 2-continued
ADJUVANTS

|   |   |   |
|---|---|---|
|   | Bifenox |   |
| 2. | Benzoic, acetic acids and phthallic compounds |   |
|   | chloramben |   |
|   | dicamba |   |
|   | bromoxynil |   |
|   | chlorthiamid |   |
| 3. | Dinitro analines, nitrites, amides, acetamides and anilides |   |
|   | Trifluralin |   |
|   | Benefin |   |
|   | Oryzalin |   |
|   | Quinonamid |   |
| 4. | Carbamates |   |
|   | Butylate |   |
|   | Asulam |   |
|   | Thiobencard |   |
| 5. | Heterocyclic Nitrogen derivatives |   |
|   | Picloram |   |
|   | Aminotriazole |   |
|   | Paraquat |   |
|   | Simazine |   |
| 6. | Urea compounds |   |
|   | Diuron |   |
|   | Bromacil |   |
|   | Terbacil |   |
|   | Isoproturon |   |
| 7. | Metal Organics and Inorganics |   |
|   | DSMA |   |
| 8. | Other Herbicides |   |
|   | Petroleum oils |   |
|   | Aromatic oils |   |
|   | Oxyfluorfen |   |
|   | Bentazon |   |
|   | Fluridome |   |
| B. | Insecticides |   |
|   | 1. | Cyclo Compounds |
|   |   | Endrin |
|   |   | Heptachlor |
|   |   | Lindane |
|   |   | Mirex |
|   | 2. | Carbamate |
|   |   | Carbofuran |
|   |   | Isoprocarb |
|   | 3. | Animal Plant Derivation and Inorganic Compounds |
|   |   | Rotenone |
|   |   | Thiocyclam |
|   | 4. | Diphenyl Compounds |
|   |   | DDT |
|   |   | Methoxychlor |
|   |   | Difluron |
|   |   | Amitraz |
|   | 5. | Organic Phosphates |
|   |   | Dicrotophos |
|   |   | Parathion |
|   |   | Malathion |
|   |   | Phorate |
|   |   | Phosmet |
|   |   | Penncap M ® (Pennwalt Corp.) |
|   |   | KnoxOut 2FM ® (Pennwalt. Corp.) |
| C. | Fungicides |   |
|   | 1. | Inorganics |
|   |   | Copper sulfate |
|   | 2. | Metal Organics |
|   |   | Cadminate (Mallinckrodt Chemical Works) |
|   | 3. | Antibiotics and Bacteriocins |
|   |   | Streptomycin |
|   |   | Cycloheximide |
|   |   | Piomy |
|   | 4. | Carbamates |
|   |   | Ferbam |
|   |   | Ziram |
|   |   | Thiram |
|   | 5. | Organic Fungicides |
|   |   | Carboxin |

TABLE 2-continued
ADJUVANTS

|   |   |   |
|---|---|---|
|   |   | Captan |
|   |   | Chloroneb |
|   |   | Benomyl |
|   |   | Metalaxyl |
| D. | Fumigants, Repellents and Rodenticides |   |
|   | 1. | Fumigants |
|   |   | Methyl bromide |
|   |   | Carbon bisulfide |
|   |   | Propylene dichloride |
|   |   | Vapam |
|   | 2. | Repellents |
|   |   | Thiram |
|   |   | Protect |
|   | 3. | Rodenticides |
|   |   | Warfarin |
|   |   | Endrin |
| II. | Fertilizers and Nutrients |   |
|   | Nitrogen |   |
|   | Phosphate |   |
|   | Potassium |   |
|   | Sulfur |   |
|   | Calcium |   |
|   | Magnesium |   |
|   | Amino acids |   |
| III. | Energy Sources |   |
|   | Sugars |   |
|   | Carbohydrates |   |
|   | ATP |   |
| IV. | Microorganisms |   |
|   | Pseudomonas species |   |
|   | Azotobacter species |   |
|   | Cyanobacteria |   |
|   | Mycorrhizal fungi |   |
|   | Rhizobia species |   |
|   | *Bacillus subtilis* |   |
|   | *Bacteroides ruminicola* |   |
|   | *Lachnospira multiparus* |   |
|   | *Aspergillus fumigates* |   |
|   | *Fusarium oxysporum* |   |
|   | Paecilomyces species |   |
|   | Flavobacterium species |   |
|   | Achromobacter species |   |
|   | Aspergillus species |   |
|   | Arthobacter species |   |
|   | Actinomycete species |   |
|   | Halophytic bacteria |   |
|   | Nitrosomonas species |   |
|   | Nitrobacter species |   |
|   | Sulfur mineralizing bacteria |   |
|   | Baculovirus species |   |
|   | *Heliothis zea* NPV |   |
|   | *Autographa Californica* NPV |   |
| V. | Growth Regulators and Hormones |   |
|   | Giberellic acid |   |
|   | Cytokinins |   |
|   | Ethoxyquin |   |
|   | Naphthalene acetic acid |   |
|   | Indolebutyric acid |   |
|   | para-chlorophenoxyacetic acid |   |
|   | Ethylene |   |
|   | Indole acetic acid |   |
| VI. | Other Biologically Active Components |   |
|   | Denitrification inhibitors |   |
|   | Iron chelators |   |
|   | Pheromones |   |
|   | Enzymes |   |
|   | Pesticide Antidotes and Safeners |   |
| VII. | Other Inert Components |   |
|   | Soil and water conditioners |   |
|   | Dispersants |   |
|   | Wetting agents |   |
|   | pH altering compounds |   |

ENCAPSULATION WITH SELECTED GEL

Once the gel has been chosen, there are numerous parameters which influence the characteristics previously mentioned.

A sodium alginate solution, for example, will form a water saturated gel when a complexing agent is added. Calcium chloride ($CaCl_2$) is generally used, however, other chlorides such as lanthanum chloride, ferric chloride and cobaltous chloride, calcium nitrate, calcium hydroxide, superphosphate fertilizer, and many pesticides such as benefin, alachlor and chlorpropham are also acceptable, as are other compounds generally with multivalent cations.

A chosen gel will have a range of concentrations usable in working the invention. The gel concentration should be chosen to optimize ease of handling, gelling time, gel strength and gel coating thickness around the seed. If the gel is too dilute, the seed may settle during gel formation and produce an uneven encapsulation. The sodium alginate, for example, can be prepared in a concentration of 1 to 10% w(in grams)/v (in milliliters) in water, more usually 2 to 10% and preferably from 3 to 5%.

The seed to be encapsulated can then be added to the sodium alginate solution at a concentration of 1 to 50 seeds per milliliter, more usually from 5 to 20 seeds per milliliter. This concentration will vary as the appropriate size of the seeds varies with species and source.

Specific adjuvants to be encapsulated with the seed can then be added to the sodium alginate and seed solution at concentrations dependent upon the desired beneficial adjuvant application rate. Pesticides, for example, can be added at a concentration of 0.0002 to 2.0 milliliters formulated pesticide ($2 \times 10^{-6}$ to 2 grams active ingredient) per milliliter sodium alginate solution, more usually from 0.002 to 0.200 milliliters formulated pesticide ($2 \times 10^{-4}$ to 0.18 grams active ingredient) per milliliter. Fertilizers, for example, can be added at a concentration of 0.1 to 200 milligrams per milliliter sodium alginate. Microorganisms can be added at a concentration of 1 to $10^{12}$ microorganisms per milliliter sodium alginate, more usually $10^4$ to $10^{10}$ microorganisms per milliliter. Carbon sources can be added at a concentration of 1 to 500 milligrams per milliliter of sodium alginate solution, more usually 5 to 100 milligrams per milliliter.

The dispersed adjuvants and seeds in gel solution can then be added dropwise to the complexing agent. Alternatively, the gel solution and complexing agent may be mixed by any of numerous techniques known to the art to obtain encapsulated seeds. These may include droplet formation and agent addition as a one step process by a vibrating nozzle which ejects a gel droplet from one source and coats the droplet with complexing agent from another.

The calcium chloride (or other complexing agent) can be made up in aqueous solution at a concentration of 1 to 1,000 millimolar, more usually 20 to 500 millimolar and ideally from 50 to 300 millimolar. Other complexing agents will have different preferred concentration ranges.

The time for gel formation and the temperature of the gelling solutions are interrelated parameters, for selected concentrations of gel and complexing agent. The temperature should be chosen so as to avoid damage to the meristematic tissue, usually in the range of 1 to 50° C., more usually 10° to 40° C., and preferably at 20° to 40° C.

Within the range of acceptable temperatures, a particular value can be chosen to give the shortest possible gelling time consistent with complete gel formation. Typically, the gel will form immediately, but the complexation takes much longer. As an example, for a solution of sodium alginate at a concentration of 3.2 grams per 100 milliliters $H_2O$, calcium chloride solution concentration of 50 millimolar and 25° C. reaction temperature, adequate gelling is obtained in 5 to 120 minutes, more often 10 to 90 minutes and is usually sufficiently complete in 30 to 60 minutes. Alternatively, if 300 millimolar calcium chloride is substituted for 50 millimolar calcium chloride, gelling time is decreased to 2-5 minutes.

The gel characteristics described above are modifiable for each gel, but are determined generally by the concentration parameters and chemical properties of the gel.

FURTHER MODIFICATIONS

In agricultural applications, it is generally preferred that harvesting be accomplished in a brief period of time and in the appropriate season. Therefore, either before or during the gelling process, it may be desirable to synchronize the germination of the seeds through techniques known to the art, such as the use of mitotic blockers or sizing through sieves, so that any given batch of encapsulated seeds will germinate at approximately the same time, progressing through development at about the same time, permitting a common harvest.

Various salts may be used to control and impede seed germination, when desired. Osmotically active monovalent salts are particularly effective in germination control. For example, sodium chloride, at concentrations of 0.1 to 1.0 molar, more usually 0.3 to 0.6 molar, will control germination of tomato seeds inside calcium alginate capsules. This germination control was effective for at least one month when encapsulated tomato seeds with salt were stored in a sealed container. Upon placement in agar water or in soil, the seeds readily and uniformly germinated at rates equal to controls that contained no salt or that were not encapsulated.

As an alternative to tomato seeds, lettuce or petunia seeds can be similarly treated for germination control.

As an alternative, potassium nitrate can replace sodium chloride at the same concentrations. Potassium nitrate has an additional effect on encapsulated seeds, being a fertilizer source of both potassium and nitrogen. Compounds with characteristically high osmotic potentials can also be useful to control seed germination. For example, sucrose at concentrations of 6 to 20% weight in grams per water in liters, more usually 8 to 15%, and ideally 10 to 14% will control germination of Brassica zygotic embryos isolated from immature seeds when encapsulated inside saturated calcium alginate capsules. This germination control was effective for at least one month when the encapsulated Brassica embryos and sucrose were stored in a sealed container. Upon placement on Schenk and Hildebrandt medium (SH) (Can.J.-Bot. 50:199-204, 1972) the embryos readily and uniformly germinated at rates equal to controls. It is predicted that the same effect would result for a seed capsule substrate.

As an alternative to salts or sucrose, abscisic acid affects seed germination. For example, abscisic acid at concentrations of $10^{-3}$ to $10^{-6}$ molar, more usually $10^{-4}$ to $10^{-5}$ molar, will similarly control Brassica embryo germination.

As another alternative, storage of encapsulated seeds at low temperatures, 0 to 10° C., more usually 2 to 8° C. in conjunction with any of salts, sucrose or abscisic acid will also control embryo germination.

Subsequent to encapsulation or planting, it may be desirable to store the encapsulated seeds, transport them to the field, hothouse or the nursery, and treat them in a manner consistent with naked or dry seed. For species unable to tolerate the ambient climatic conditions without some period of acclimization, these encapsulated seeds may be first planted in a nursery or hothouse. Alternatively, for hardier species, the encapsulated seeds may be planted directly in the field through numerous known techniques for botanic seed.

EXPERIMENTAL

In order to demonstrate the invention, the following experiments were carried out with a variety of seeds, gel media and adjuvants. All quantities labelled percent (%) are grams per 100 milliliters, unless otherwise indicated.

EXAMPLE A: (tomato seeds)

1. Encapsulation with Bensulide (Prefar ®)

Tomato seeds, Campbell 28, lot #2271-156 (A. Castle Co., Inc.), were adjusted to a concentration of 80 seeds per 10 milliliters of 3.2% sodium alginate at 25° C. To this mixture was added 0.2 milliliters of bensulide S((o-,o-diisopropyl phosphorodithioate) ester of N-(2-mercaptoethyl) benzenesulfonamide), a plant herbicide. The mixture was stirred into a slurry and then dispensed dropwise from a 5 milliliter Pipetman pipette into 50 milliliters of 100 millimolar calcium chloride at 25° C. At these concentrations, capsules formed immediately, but the complete complexation required 20 to 60 minutes. At this point, the calcium chloride solution was poured off and the saturated capsules containing tomato seeds and bensulide were collected.

The saturated seed capsules were planted in aluminum trays (8 inches by 12 inches) containing two inches of a soil mixture consisting of sand, sphagnum peat moss, fir bark, calcium nitrate, urea formaldehyde, superphosphate, calcium carbonate lime, dolomite and iron sulfate. The capsules were placed in a row ¼ inch deep parallel to the long axis of the aluminum tray and covered with the soil mixture. Weed seeds (barnyard grass, pigweed, wild mustard, crabgrass, wild oats and lamb's quarter) were then spread in parallel rows perpendicular to the row of capsules. The trays were placed in a greenhouse and watered when the soil dried.

Using the above protocol, tomato seed germination rates of 120 to 156% over the controls were achieved. The tomato plants grown from herbicide encapsulated seeds were equal in height, color and leaf size and shape to the controls. One set of controls were tomato seeds treated as described in the above protocol with the omission of the bensulide. A second set of controls consisted of tomato seeds that were not encapsulated or treated with the bensulide, but were otherwise treated as described in the above protocol.

Weed seed germination was inhibited within a narrow zone bounded by the width of the row above the encapsulated tomato seeds. All six weed species were affected by the herbicide.

1A. As an alternative herbicide concentration, 0.02 milliliters of bensulide can replace the 0.2 milliliters of bensulide in the protocol of A.1. Tomato seed germination rates were 127 to 179% over the controls but little weed control was evident.

2. Encapsulation with EPTC (Eptam ®)

The experimental protocol A.1. was duplicated, substituting EPTC (S-ethyl dipropylthiocarbamate) at a concentration of 0.2 milliliters per 10 ml sodium alginate for bensulide. Tomato seed germination rates were 150 to 159% over that of the controls. The tomato plants were equal in height, color, and leaf size and shape to the controls. Weed control differed from that of protocol A.1 in that the zone of weed inhibition was extended to 1 inch from either edge of the row of encapsulated tomato seeds.

2A. As an alternative herbicide concentration, 0.02 milliliters of EPTC can replace the 0.2 milliliters of EPTC in the protocol of A.2. Tomato seed germination rates of 123 to 194% over the controls were achieved with similar results as described in protocol A1.

2B. As an alternative herbicide concentration, 0.002 milliliters of EPTC can replace the 0.2 milliliters of EPTC in the protocol of A2. Tomato seed germination rates of 147% over the controls was achieved. Tomato plant quality was the same as described in protocol A2. Weed control was the same as described in protocol A2, but only for wild mustard, crabgrass and lamb's quarter.

3. Encapsulation with Metribuzin (Lexone ®)

The experimental protocol of A1 was duplicated, substituting metribuzin (4-amino-6-(1,1- dimethylethyl)-3-(methylthio)-1,2,4-triazin-5(4H)-one) at a concentration of 0.002 milliliters per 10ml sodium alginate for bensulide. Tomato seed germination rate was 118% over that of the controls. The tomato plants were reduced in size as compared to the controls. Weed control was the same as in protocol A1, except that only wild mustard and lamb's quarter seeds were controlled.

4. Encapsulation with Pebulate (Tillam ®)

The encapsulation protocol of A1 was duplicated, substituting pebulate (S-propyl butylethylthiocarbamate) at a concentration of 0.02 milliliters per 10 ml sodium alginate for bensulide. Tomato seed germination rate was 108% over that of the controls. The tomato plants were equal in height, color, and leaf size and shape to the controls. Weed control was the same as described in Protocol A1 except that only crabgrass and wild oats were controlled.

5. Encapsulation with Diphenamid

The encapsulation protocol of A1 was duplicated substituting diphenamid (N,N-dimethyl-2,2diphenylacetamide) at a concentration of 4 mg per 10 milliliters sodium alginate for bensulide. Tomato seed germination rate was 100% over that of the controls. The tomato plants were equal in height, color, and leaf size and shape to the controls. Weed control was the same as described in Protocol A2 except that only crabgrass and lamb's quarter were controlled.

EXAMPLE B (Celery)

Celery Seeds

Celery seeds, Florida 683 lot #11621-12526 (Ferry Morse Co.), were encapsulated as described in protocol A1 with the exception of substituting 0.002 milliliters of EPTC per 10 ml sodium alginate for bensulide. Celery seed germination rate was 147% over that of the controls. The celery plants were equal in height, color, and leaf size and shape to the controls. Weed control was the same as described in protocol A2 except that only wild mustard, crabgrass and lamb's quarter were controlled.

EXAMPLE C (Lettuce)

Lettuce seeds, Salinas GH-11 (Moran) were encapsulated as described in protocol A1 with the exception of substituting 0.002 to 0.02 millimeters of pronamide (3,5-dichloro-N-(1,1-dimethy-12-propynyl)-benzamide) per 10 ml sodium alginate for bensulide. Lettuce seed germination rates were 78 to 86% of that of the controls. The lettuce plants were equal in height, color, and leaf size and shape of the controls.

EXAMPLE D (Brassica)

1. Encapsulation with Trifluralin (Treflan ®)

Brassica, PHW Ccc-1 (Dr. Paul H. Williams, University of Wisconsin), zygotic embryos isolated from immature seeds were encapsulated as described in protocol A1 with the exception of substituting 2 to 100 microliters of trifluralin ($\alpha,\alpha,\alpha$-trifluoro-2,6-dinitro-N,N-dipropyl-p-toluidine) and sowing the capsules on 0.8% w/v agar water. Seed germination rates were 80 to 95% of the controls. The Brassica plants were equal in height, color, and leaf size and shape to the controls.

2. Encapsulation with Bensulide

The experimental protocol D1 was duplicated substituting bensulide at concentrations of 2 to 10 microliters for trifluralin. Seed germination rates were 90 to 113% of the controls and the plants were equal in height, color, and leaf size and shape to the controls. Weed seed germination was inhibited for wild mustard, lamb's quarter and pigweed.

EXAMPLE E (Alfalfa)

1. Encapsulation with an Insecticide/Fungicide

Alfalfa seeds, Saranac AR Lot #27-07-765 (Whitney Dickerson Seed Growers, Homedale, ID), were encapsulated as described in protocol A1 with the exception of substituting 0.02 milliliters of diazinon (o,o-diethyl o-(2-isopropyl-4-methyl-6-pyrimidinyl) phosphorothiote) at a concentration of 0.02 milliliters per 10 milliliters of sodium alginate for bensulide. Alfalfa seed germination rate was 78% of the control. The alfalfa plants were equal in height, color, and leaf size and shape to the controls. No weed seeds were tested.

2. Encapsulation with an Insecticide/Fungicide and a Herbicide

As an alternative combination of pesticides, 0.02 to 0.2 milliliters of diazinon and 0.002 to 0.02 milliliters of EPTC were mixed with 10 milliliters of sodium alginate and encapsulated with alfalfa seeds as in protocol E1. Alfalfa seed germination rates were 78 to 85% of the controls. The alfalfa plants were equal in height, color, and leaf size and shape to the controls. Weed control was the same as in protocol A1, except that only wild mustard and crabgrass were controlled.

3. Encapsulation with Sodium Alginate and Gelatin

As an alternative gel matrix to protocol E1, 2.0% sodium alginate and 5% gelatin were mixed with 0.01 milliliter chlorpropham (isopropyl m-chlorocarbanilate) and 80 alfalfa seeds. The mixture was dropped into 50 milliliters of 100 millimolar solution of calcium chloride. Semi-solid, intact, saturated, spherical capsules were recovered.

4. Encapsulation with Carrageenan and Locust Bean Gum

As an alternative gel matrix to protocol E1, 0.40% carrageenan and 0.40% locust bean gum were mixed with 0.10 milliliters of EPTC and 80 alfalfa seeds. The mixture was dropped into 50 milliliters of 300 millimolar solution of potassium chloride. Semi-solid, intact, spherical capsules were recovered.

5. Encapsulation with Agar

As an alternative gel matrix to protocol E1, 5.0% agar was used to make saturated capsules by complexation with 100 millimolar tannic acid.

6. Encapsulation with Carboxymethylcellulose

As an alternative gel matrix to protocol E1, 2.50% carboxymethylcellulose was used to make saturated capsules by complexation with either 100 millimolar copper sulfate or 50 millimolar aluminum sulfate.

7. Encapsulation with Gum Tragacanth

As an alternative gel matrix to protocol E1, 2.5% gum tragacanth was used to make saturated capsules by complexation with 100 millimolar calcium chloride.

8. Encapsulation with Sodium Pectate

As an alternative gel matrix to protocol E1, 2.0% sodium pectate was used to make saturated capsules by complexation with either 100 millimolar calcium chloride or 100 millimolar copper sulfate.

9. Encapsulation with Borden Polyco 2113

As an alternative gel matrix to protocol E1, liquid Borden Polyco 2113 ® (vinyl acetate homopolymer) was used to make saturated capsules by complexation with 100 millimolar tannic acid.

10. Encapsulation with Benefin as a Complexing Agent (Balan)

As an alternative complexing agent to protocol E1, benefin (n-butyl-N-ethyl-$\alpha,\alpha,\alpha$-trifluoro-2,6-dinitro-p-toluidine) was substituted for 100 millimolar calcium chloride. Ten milliliters of 3.2% sodium alginate containing alfalfa seeds were dropped into formulate benefin. Semi-solid, flat hard capsules were recovered.

11. Encapsulation with Alachlor as a Complexing Agent (Lasso ®)

As an alternative complexing agent, alachlor (2-chloro-2,6-diethyl-N-(methoxymethyl)acetanilide) can be substituted for benefin as a complexing agent for sodium alginate as described in protocol E10.

12. Encapsulation with Chlorpropham as a Complexing Agent (Furloe ®)

As an alternative complexing agent, chlorpropham can be substituted for benefin as described in protocol E10.

13. Encapsulation with Superphosphate as a Complexing Agent

As an alternative complexing agent, superphosphate fertilizer in concentrations of 50–400 milligrams per 20 milliliters of water can be substituted for calcium chloride as in E10.

EXAMPLE F. (Nutrient Encapsulation)

Tomato seeds were encapsulated as described in protocol A1 with the exception that potassium phosphate was added as a fertilizer to the alginate mix at concentrations of 4 to 200 milligrams per 5 milliliters of sodium alginate rather than adding an herbicide for weed control. Tomato seed germination rates were comparable to those of the controls.

1.a. As an alternative to potassium phosphate, calcium phosphate at concentrations of 5 to 200 milligrams can be added to the alginate mix as a fertilizer.

1.b. As an alternative to potassium phosphate, starch at concentrations of 25 to 500 milligrams can be added to the alginate mix as a carbon source.

1.c. As an alternative to potassium phosphate, ammonium nitrate at concentrations of 50 to 2000 milligrams can be added to the alginate mix as a fertilizer.

1.d. As an alternative to potassium phosphate, potassium nitrate at concentrations of 300 to 500 millimolar can be added to the alginate mix as a fertilizer.

EXAMPLE G. (Double Capsules)

1. Calcium Alginate Beads

Calcium alginate beads, made by dropping 3.2% sodium alginate into 100 millimolar calcium chloride, were re-mixed with 3.2% sodium alginate and dropped into 100 millimolar calcium chloride to produce double layered, saturated capsules.

2. Superphosphate Alginate Beads 3.2% sodium alginate was complexed as beads in a 0.50 to 1.0% solution of superphosphate fertilizer. The 3.2% sodium alginate hardened beads were resuspended in 3.2% sodium alginate and complexed as double layered, saturated beads in 100 millimolar calcium chloride.

2.a. As an alternative complexing agent for the second complexation, benefin can be used.

EXAMPLE H (Capsule Storage)

1. Low Temperature Storage

Alfalfa seeds encapsulated as in protocol E1 but without a herbicide can be stored in a sealed container at −20° C. for at least 14 days wthout germination. The seeds germinate at 85% of the controls when returned to 25 C.

2. Germination Control with Salt

Tomato seeds, UC82 (Asgrow Seed Co., Lot #VGY 9225, Size 8), encapsulated according to protocol E1, but without a herbicide, can be stored in sealed containers without seed germination for up to one month at ambient temperatures when 0.3 to 0.5 molar sodium chloride is added to the sodium alginate mixture before gelatin. The encapsulated seeds germinated as rapidly and uniformly as controls when placed on agar water or in soil.

2.a. As an alternative to sodium chloride, potassium nitrate can be encapsulated with sodium alginate and seeds at concentrations of 0.30 to 0.50 molar.

2.b. As an alternative seed material, lettuce (Seagreen, lot #H-96-271 HB, USDA, Salinas, Calif.) or petunia (confetti multiflora dwarf color mixture, lot #304, Northrup King) seeds can be encapsulated with germination control.

3. High Osmotic Potentials

Brassica zygotic embryos, encapsulated as in protocol E1, but without a herbicide, were stored for up to one month in a sealed container by including 12% sucrose in the sodium alginate mixture. The encapsulated zygotic embryos readily germinated as well as controls when placed on Schenk and Hildebrandt medium.

4. Abscisic Acid

The experimental protocol H3 was duplicated by substituting abscisic acid at concentrations of $10^{-4}$ to $10^{-6}$ millimolar for sucrose.

5. Cool Temperature Storage

The experimental protocols H3 and H4 were duplicated by an additional treatment to the capsules of 4° C. storage temperature for one month.

EXAMPLE I (Microorganisms)

1 Encapsulation with Pea and Rhizobia

Thirty seeds of *Pisum sativa*, miragreen variety (Ferry Morse Co.), were mixed with 9 milliliters of sodium alginate plus 6 milliliters of a TY nutrient broth solution (5 grams bactotyptone, 3 grams yeast extract, 15 grams agar per 1000 milliliters water, ref. J. Beringer, "Journal General Microbiology" 84: 188, 1974) containing *Rhizobia legumenosarum*. The concentration of the Rhizobia was $2.8 \times 10^8$ bacteria per milliliter nutrient broth or $5 \times 10^6$ bacteria per capsule. The capsules containing seeds, bacteria, nutrient broth and sodium alginate were dropped into 100 millimolar calcium chloride and hardened for thirty minutes. The hardened saturated capsules were removed from the calcium chloride, washed with water, and planted in sterile soil in a sealed container. The seeds germinated and vigorous, healthy plants were recovered in 12 days. The Rhizobia bacteria population remained at high levels during germination, dropping only to $6 \times 10^5$ bacteria per capsule.

2. Encapsulation with Corn and Azospirillum

The experimental protocol of I1 was duplicated using Zea mays seeds, Goldcrest hybrid (Ferry Morse Co.), instead of Pisum and using Azospirillum strain 242 instead of Rhizobia. The initial Azospirillum concentration was $2.4 \times 10^{10}$ bacteria per milliliter nutrient broth or $4 \times 10^8$ bacteria per saturated capsule. The concentration dropped to $1 \times 10^8$ bacteria per capsule during seed germination.

3. Encapsulation with Lettuce and Bacillus

The experimental protocol of I1 was duplicated using *Lactuca sativa* instead of Pisum using *Bacillus thurinoiensis* HD-1 instead of Rhizobia, and L nutrient broth (10 grams bactotyptone, 5 grams yeast extract, 5 grams sodium chloride, 15 grams agar in 1000 milliliters water, ref. E. S. Lennox, "Virology" 1:190, 1955) instead of TY broth. The initial Bacillus concentration was $7.7 \times 10^8$ bacteria per milliliter broth or $1.6 \times 10^5$ bacteria per capsule. The concentration dropped to $1.3 \times 10^4$ bacteria per capsule during seed germination.

3.a. As an alternative microorganism, *Eschericia coli* can replace Bacillus. The initial concentration was $4 \times 10^9$ bacteria per milliliter broth or $6.8 \times 10^7$ bacteria per capsule. The concentration dropped to $1.9 \times 10^4$ bacteria per capsule during seed germination.

4. Encapsulation with Alfalfa and Rhizobia

The experimental protocol of II was duplicated using *Medicago sativa*. Saranac AR FC45002, instead of Pisum and *Rhizobia meliloti* instead of *R. leguminosarum*. The initial *R. meliloti* concentration was $1.5 \times 10^9$ bacteria per milliliter of broth or $2.6 \times 10^7$ bacteria per capsule.

5 Encapsulation with Tomato and Pseudomonas

The experimental protocol of I3 was duplicated using *Lycopersicum esculentum*, Early Pak (trade name), instead of lettuce and Pseudomonas sp. KLH76 instead of Bacillus. The initial Pseudomonas concentration was $8 \times 10^6$ bacteria per milliliter broth or $1.4 \times 10^5$ bacteria per capsule.

Although the foregoing invention has been described in some detail by way of illustration and example, for purposes of clarity of understanding, it will be obvious that to those skilled in the art certain changes and modifications may be practiced within the scope of the appended claims.

We claim:

1. A method for delivering seed to an environment for growth and development comprising:
   isolating botanic seed having the potential to differentiate to produce an entire plant body; and,
   encapsulating said botanic seed together with at least one adjuvant capable of affecting the botanic seed, the resulting plant body or the environment, in a water saturated hydrogel capsule.

2. A method as recited in claim 1 wherein said adjuvant is a member selected from the group consisting of pesticides, herbicides, insecticides, fungicides, fumigants, repellants, rodenticides, fertilizers, nutrients, sugars, carbohydrates, adenosine triphosphate, microorganisms, growth regulators and hormones.

3. A method as recited in claim 1 wherein said seed is encapsulated in at least one gel selected from the group consisting of alginate, carrageenan, locust bean gum and gel agents identified in Table 1.

4. A method as recited in claim 1 wherein said seeds are encapsulated together with at least one adjuvant selected from the group consisting of bensulide, EPTC, metribuzin, pebulate, protetryn, pronamide, chlorpropham, alachlor, diazinon, superphosphate, calcium phosphate, potassium phosphate, potassium nitrate, calcium nitrate, ammonium nitrate, starch, sucrose, *Rhizobia meliloti, Rhizobia leguminosarum, Eschericia coli*, and the adjuvants identified in Table 2.

5. A method as recited in claim 1 further comprising the step of encapsulating said seed and a plurality of adjuvants in distinct regions of the saturated hydrogel, whereby the adjuvants, seed and environment are allowed to interact in a progressive manner.

6. A method as recited in claim 1 wherein each of said distinct regions of the saturated hydrogel capsule comprises a gel agent distinct from gel agents in adjacent regions.

7. Botanic seed encapsulated in a water saturated hydrogel capsule together with at least one adjuvant capable of affecting the botanic seed, the resulting plant body or the environment.

8. A saturated hydrogel capsule as in claim 7 wherein said adjuvant is a member selected from the group consisting of pesticides, herbicides, insecticides, fungicides, fumigants, repellants, rodenticides, fertilizers, nutrients, sugars, carbohydrates, adenosine triphosphate, microorganisms, growth regulators and hormones.

9. A saturated hydrogel capsule as in claim 7 wherein said hydrogel capsule is formed from a gel agent selected from the group consisting of alginate, carrageenan, locust bean gum and gel agents identified in Table 1.

10. A saturated hydrogel capsule as in claim 7 wherein said adjuvant is a member selected from the group consisting of bensulide, EPTC, metribuzin, pebulate, protetryn, pronamide, chlorpropham, alachlor, diazinon, superphosphate, calcium phosphate, potassium phosphate, potassium nitrate, calcium nitrate, ammonium nitrate, starch, sucrose, *Rhizobia meliloti, Rhizobia leguminosarum, Eschericia coli*, and the adjuvants listed in Table 2.

11. A saturated hydrogel capsule as in claim 7 wherein a plurality of adjuvants are encapsulated in distinct regions of the hydrogel capsule, whereby the adjuvants, seed and environment are allowed to interact in a progressive manner.

12. A hydrated hydrogel capsule as in claim 11 wherein each of said distinct regions of the capsules comprises a gel agent distinct from gel agents in adjacent regions.

13. A delivery system for delivering seed to an environment for growth and development which comprises:
    botanic seed having the potential to differentiate to produce an entire plant body;
    at least one adjuvant in a concentration capable of affecting the seed, resulting plant body or said environment; and,
    a water saturated hydrogel matrix, containing free water available to the seed to initiate the process of germination, encapsulating said seed and adjuvant, whereby said tissue and adjuvant are delivered simultaneously to the environment.

14. A system as in claim 13 wherein said adjuvant is a member selected from the group consisting of pesticides, herbicides, insecticides, fungicides, fumigants, repellants, rodenticides, fertilizers, nutrients, sugars, carbohydrates, adenosine triphosphate, microorganisms, growth regulators and hormones.

15. A system as in claim 13 wherein said saturated hyrdogel matrix is formed from a gel agent selected from the group consisting of alginate, carrageenan, locust bean gum and gel agents identified in Table 1.

16. A system as in claim 13 wherein said adjuvant is a member selected from the group consisting of bensulide, EPTC, metribuzin, pebulate, protetryn, pronamide, chlorpropham, alachlor, diazinon, superphosphate, calcium phosphate, potassium phosphate, potassium nitrate, calcium nitrate, ammonium nitrate, starch, sucrose, *Rhizobia meliloti, Rhizobia leguminosarum, Eschericia coli*, and the adjuvants listed in Table 2.

17. A system as in claim 13 wherein a plurality of adjuvants are encapsulated in distinct regions of the saturated hydrogel matrix, whereby the adjuvants, seed and environment are allowed to interact in a progressive manner.

18. A system as in claim 17 wherein each of said distinct regions of the saturated hydrogel matrix comprises a gel agent distinct from the gel agents in adjacent regions.

* * * * *